United States Patent
Yui et al.

(10) Patent No.: US 10,960,585 B2
(45) Date of Patent: Mar. 30, 2021

(54) GASKET, METHOD FOR PRODUCING SAME, AND METHOD FOR HANDLING SAME

(71) Applicant: NOK CORPORATION, Tokyo (JP)

(72) Inventors: Hajime Yui, Kanagawa (JP); Kenichi Oba, Kanagawa (JP); Takuro Nishimura, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 285 days.

(21) Appl. No.: 16/065,438

(22) PCT Filed: Dec. 19, 2016

(86) PCT No.: PCT/JP2016/087748
§ 371 (c)(1),
(2) Date: Jun. 22, 2018

(87) PCT Pub. No.: WO2017/110730
PCT Pub. Date: Jun. 29, 2017

(65) Prior Publication Data
US 2019/0001540 A1    Jan. 3, 2019

(30) Foreign Application Priority Data
Dec. 24, 2015 (JP) .............................. JP2015-251695

(51) Int. Cl.
*B29C 45/14*      (2006.01)
*H01M 8/0271*    (2016.01)
(Continued)

(52) U.S. Cl.
CPC ........ *B29C 45/14262* (2013.01); *B29C 45/14* (2013.01); *F16J 15/10* (2013.01);
(Continued)

(58) Field of Classification Search
CPC ............................ B29C 45/14262; F16J 15/10
See application file for complete search history.

(56) References Cited

FOREIGN PATENT DOCUMENTS

| CN | 101476623 A | 7/2009 |
|----|-------------|--------|
| CN | 203051758 U | 7/2013 |

(Continued)

OTHER PUBLICATIONS

Official Communication issued in European Patent Office (EPO) Patent Application No. 16878619.2, dated Nov. 15, 2018.
(Continued)

*Primary Examiner* — Nathan T Leong
(74) *Attorney, Agent, or Firm* — Greenblum & Bernstein, P.L.C.

(57) ABSTRACT

A gasket with a carrier film containing a combination of a rubber-only gasket body and a carrier film holding the gasket body. The carrier film can be easily detached from the gasket body even when the gasket body adheres to the carrier film. In embodiments, the gasket contains a combination of a rubber-only gasket body and a carrier film holding the gasket body. A tab enlarging the plane area of the gasket body is integrally provided in the gasket body. As a method for handling the gasket, when the carrier film is detached from the gasket body, the carrier film is detached from the gasket body in a state where the gasket body is fixed to a base with the tab or the carrier film is detached from the gasket body with the tab in a state where the carrier film is fixed to the base.

13 Claims, 12 Drawing Sheets

(51) Int. Cl.
*F16J 15/10* (2006.01)
*H01M 8/02* (2016.01)

(52) U.S. Cl.
CPC ........... *F16J 15/106* (2013.01); *F16J 15/108* (2013.01); *H01M 8/0271* (2013.01); *B29C 2045/14213* (2013.01); *H01M 8/02* (2013.01); *Y02P 70/50* (2015.11)

(56) References Cited

FOREIGN PATENT DOCUMENTS

| CN | 107208797 | A | 9/2017 |
|---|---|---|---|
| CN | 107407414 | A | 11/2017 |
| CN | 107407416 | A | 11/2017 |
| CN | 107532718 | A | 1/2018 |
| EP | 2320719 | | 5/2011 |
| EP | 3282151 | | 2/2018 |
| EP | 3287673 | | 2/2018 |
| EP | 3306147 | | 4/2018 |
| EP | 3306148 | | 4/2018 |
| JP | 54-159552 | | 12/1979 |
| JP | 2005-3181 | | 1/2005 |
| JP | 2005003181 | * | 1/2005 |
| JP | 2010-127424 | | 6/2010 |
| JP | 2010127424 | * | 8/2013 |
| JP | 2014-60133 | | 4/2014 |
| WO | 2008/126618 | | 10/2008 |

OTHER PUBLICATIONS

Official Communication issued in International Bureau of WIPO Patent Application No. PCT/JP2016/087748, dated Mar. 21, 2017.
Chinese Office Action, Chinese Patent Office, Patent Application No. 201680072867.5, dated Jul. 1, 2019.

* cited by examiner

GASKET, METHOD FOR PRODUCING SAME, AND METHOD FOR HANDLING SAME

BACKGROUND OF THE INVENTION

Field of the Invention

The present invention relates to a gasket relating to a sealing technique and more specifically relates to a gasket with a carrier film containing a combination of a rubber-only gasket body and a carrier film holding the gasket body, a method for producing the same, and a method for handling the same. The gasket of the present invention is used as a fuel cell gasket or used as a general gasket for other uses, for example.

Description of the Conventional Art

Mentioned as the fuel cell gasket are gaskets of various configurations, such as a rubber-only gasket containing a gasket containing a rubber-like elastic body (rubber) alone, a separator integrated gasket in which a gasket containing a rubber-like elastic body is integrally molded in a separator, and a GDL integrated gasket in which a gasket containing a rubber-like elastic body is integrally molded in a GDL (Gas Diffusion Layer).

These gaskets each have features but, in recent years, a demand for a cost reduction has been strong, and therefore the rubber-only gasket capable of satisfying the demand has drawn attention.

Figure 8A:
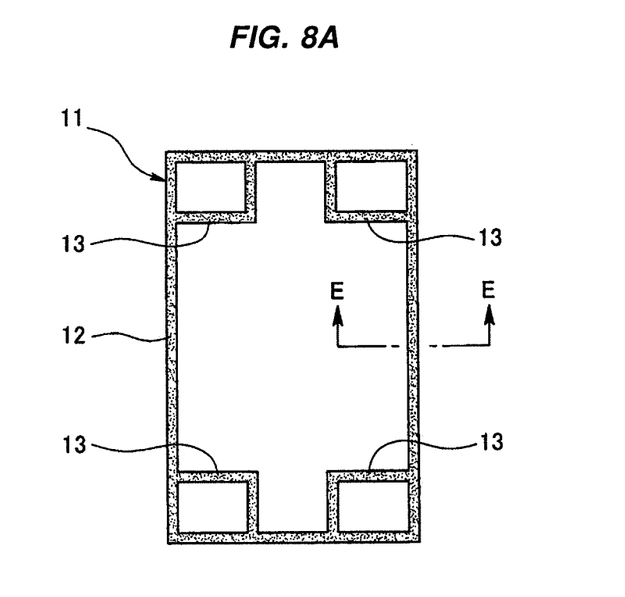
Figure 8B:
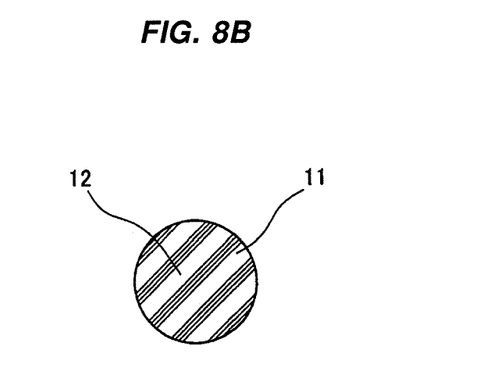

The rubber-only gasket is configured as illustrated in FIGS. 8A and 8B, for example.

More specifically, a gasket 11 is formed into a planar shape (plate shape) as a whole and an outer peripheral seal portion 12 for sealing the entire circumference of the surrounding of a reaction surface of a fuel cell is provided in a planar rectangular frame shape. Moreover, in order to seal the surrounding of each manifold portion, manifold seal portions 13 are integrally provided in both end portions in the longitudinal direction of the outer peripheral seal portion 12. The cross-sectional shape of the gasket 11 is formed into a circular cross section as illustrated in FIG. 8B.

PRIOR ART DOCUMENT

Patent Documents

Patent Document 1: Japanese Unexamined Patent Publication No. 2014-60133 (see gasket 3 in FIGS. 1A and 1B, for example)

However, there is room for further improvement of the rubber-only fuel cell gasket 11 in the following respects.

More specifically, the fuel cell gasket 11 is generally configured so that, while the planar outer shape is set to a size of about 400 mm×300 mm, the cross-sectional shape (wire diameter) thereof is set to be as small as about 1 mm to several millimeters. Therefore, the gasket 11 alone is likely to be twisted in carrying or stacking, and therefore the handling workability (handling property) is not good.

Figure 9A:
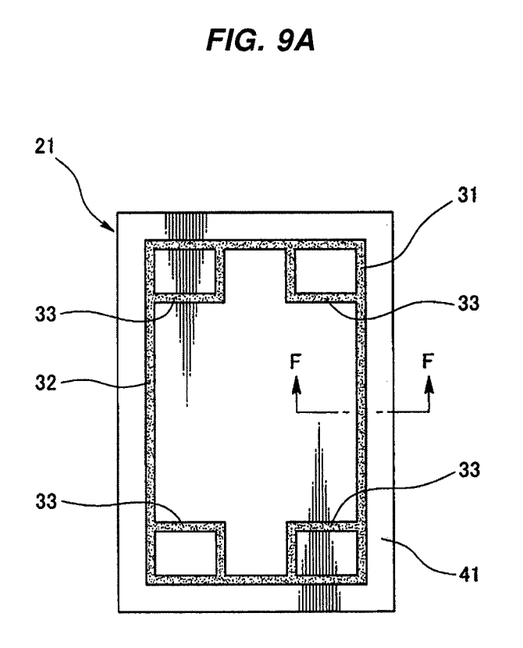
Figure 9B:
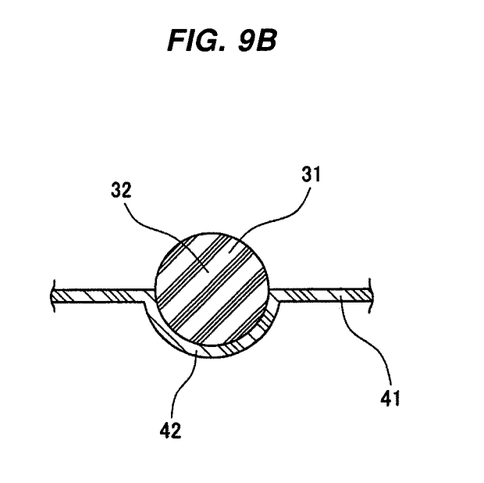

Then, the applicant of this application has previously proposed a gasket 21 with a carrier film containing a combination of a rubber-only gasket body 31 and a resin carrier film 41 holding the gasket body 31 in a non-bonding state as illustrated in FIGS. 9A and 9B. According to the gasket 21 with the carrier film, the rubber-only gasket body 31 is held with the carrier film 41 having strength higher than the strength of the rubber-only gasket body 31, and therefore a twist is hard to occur, so that the handling workability can be improved.

The gasket body 31 is formed into a planar shape (plate shape) as a whole in the same manner as in the gasket 11 in FIGS. 8A and 8B, and an outer peripheral seal portion 32 for sealing the entire circumference of the surrounding of a reaction surface of a fuel cell is provided in a planar rectangular frame shape. Moreover, in order to seal the surrounding of each manifold portion, manifold seal portions 33 are integrally provided in both end portions in the longitudinal direction of the outer peripheral seal portion 32. As illustrated in FIG. 9B, the cross-sectional shape of the gasket body 31 is formed into a circular cross section. On the other hand, the carrier film 41 contains a resin film formed into a planar rectangular shape larger than the gasket body 31 and a gasket holding portion 42 containing a three-dimensional shape for holding the gasket body 31 is molded on the plane thereof.

The gasket 21 with the carrier film is produced as follows. For the production, a mold for injection-molding the rubber-only gasket body 31 is used.

Figure 10A:
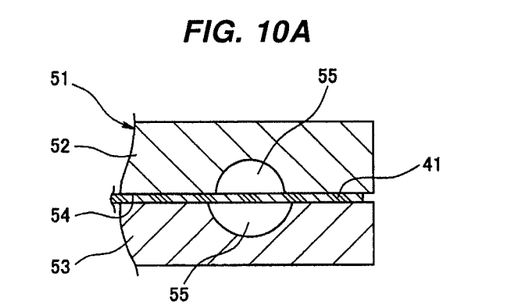
FIGS. 10A to 10D each are views explaining a method for producing the gasket.

As a process, first, the carrier film 41 of a planar shape cut into a planar shape of a predetermined size is prepared, and then a mold 51 is clamped in a state where the carrier film 41 is inserted between parting portions 54 of the mold 51 as illustrated in FIG. 10A. The mold 51 has a combination of an upper mold (one divided mold) 52 and a lower mold (the other divided mold) 53 and cavity portions 55 are provided one by one corresponding to the parting portions 54 of both the molds 52 and 53. The entire surface of the carrier film 41 originally has a planar shape, and therefore the carrier film 41 is brought into a state of crossing the inside of the cavity portions 55.

Figure 10B:
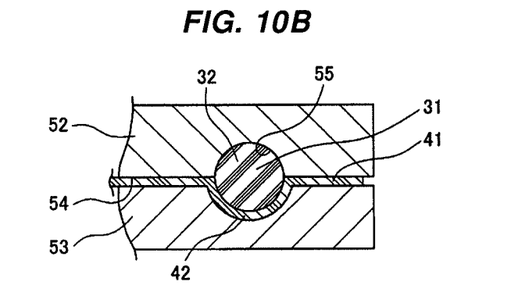

Subsequently, as illustrated in FIG. 10B, a molding material for molding the gasket body 31 is charged into the cavity portions 55, and then heated, for example, to mold the gasket body 31. When the molding material is charged into the cavity portions 55, a part on the plane of the carrier film 41 is pressurized against the inner surface of the cavity portion 55 of the lower mold 53 by the molding material charging pressure, and is deformed (plastically deformed) into a shape along the inner surface of the cavity portions 55, whereby the gasket holding portion 42 containing a three-dimensional shape is molded.

Figure 10C:
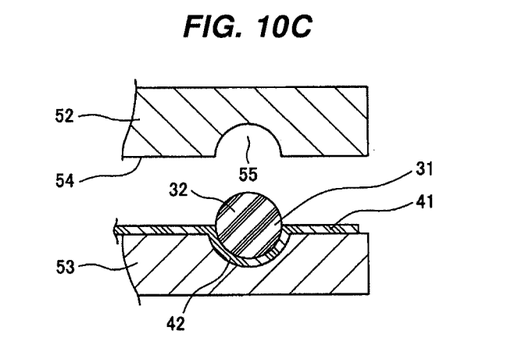
Figure 10D:
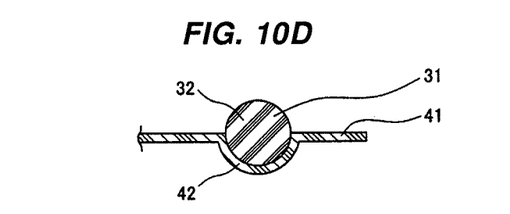

Subsequently, after the molding of the gasket body 31, the mold is opened as illustrated in FIG. 10C, and then the gasket body 31 and the carrier film 41 are simultaneously taken out from the mold 51 as illustrated in FIG. 10D. The gasket body 31 and the carrier film 41 which are taken out are brought into a combination state in which the gasket body 31 is held by the carrier film 41. In the combination state, a product is carried or stored, for example.

When the gasket body 31 is attached to a fuel cell stack, the carrier film 41 is detached from the gasket body 31, and then only the gasket body 31 is attached.

SUMMARY OF THE INVENTION

Problem to be Solved by the Invention

Figure 11A:
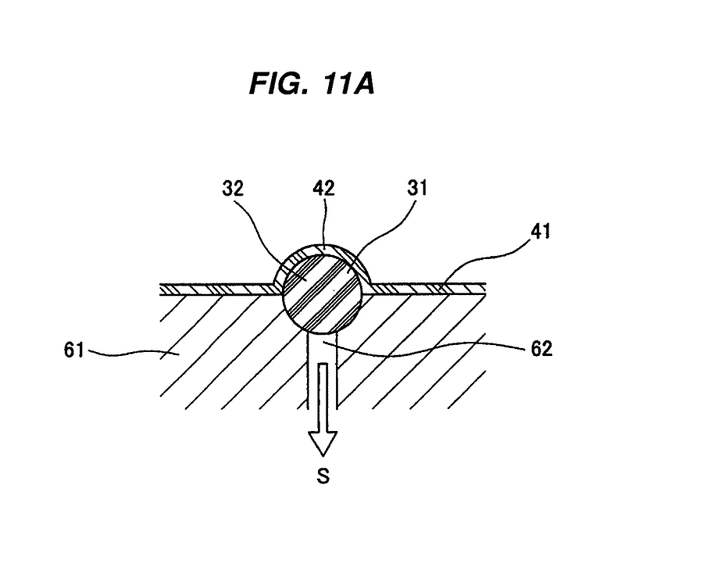
FIGS. 11A and 11B each are views explaining a method for handling the gasket.
Figure 11B:
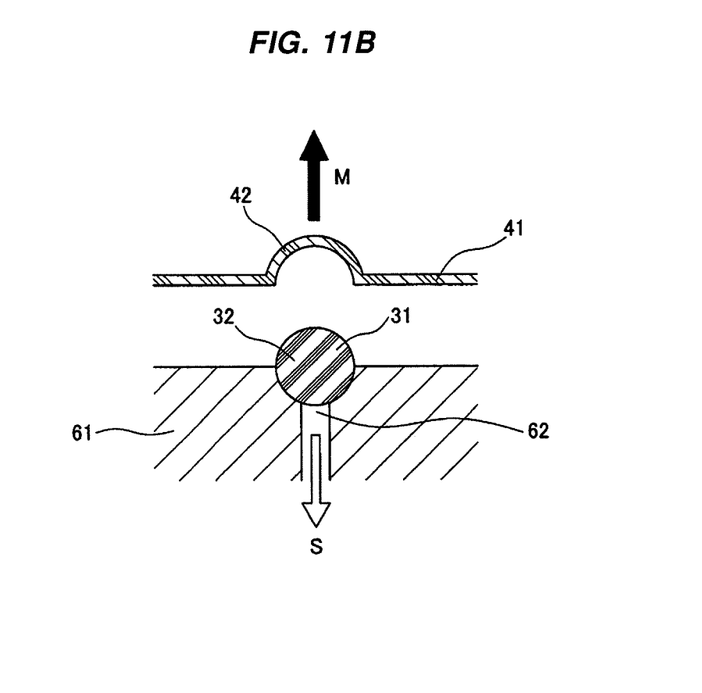

When the carrier film 41 is detached from the gasket body 31, the gasket body 31 is set in an adsorption portion 62 of an evacuation device 61 as a base, and then evacuation (arrow S) is performed to adsorb (fix) the gasket body 31 and detach (arrow M) the carrier film 41 from the gasket body 31 in this state as illustrated in FIGS. 11A and 11B, for example.

Figure 12A:
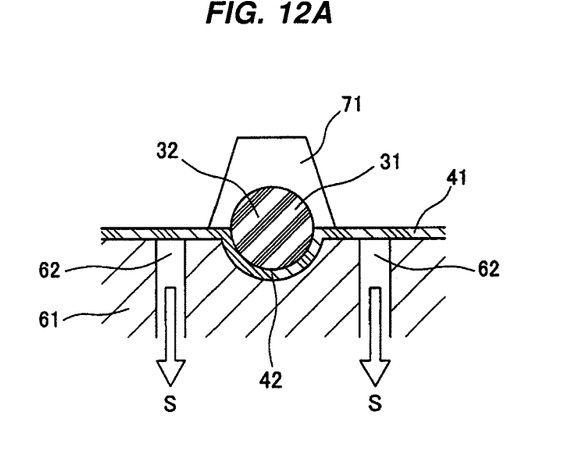
FIGS. 12A and 12B each are views explaining a method for handling the gasket.
Figure 12B:
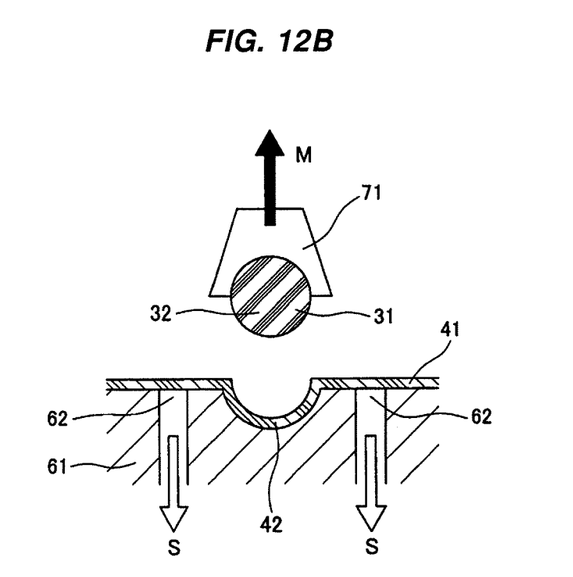

Alternatively, on the contrary, the carrier film 41 is set in the adsorption portion 62 of the evacuation device 61 as the base, and then evacuation (arrow S) is performed to adsorb (fix) the carrier film 41 and relatively detach (arrow M) the carrier film 41 from the gasket body 31 in this state by using a chucking jig 71 or the like as illustrated in FIGS. 12A and 12B.

In the detachment, the carrier film 41 should be able to be easily detached because the carrier film 41 is not bonded to the gasket body 31. However, when the gasket body 31 has adhesiveness on the surface due to the material quality and adheres to the carrier film 41, the carrier film 41 needs to be strongly peeled off from the gasket body 31, and thus the detachment becomes difficult.

Then, in view of the above-described problems, it is an object of the present invention to provide a gasket with a carrier film containing a combination of a rubber-only gasket body and a carrier film holding the gasket body, in which, when the carrier film is detached from the gasket body, the carrier film can be easily detached even when the gasket body adheres to the carrier film, a method for producing the same, and a method for handling the same.

Means for Solving the Problem

In order to achieve the object, a gasket of the present invention is a gasket with a carrier film containing a combination of a rubber-only gasket body and a carrier film holding the gasket body, in which a tab enlarging the plane area of the gasket body is integrally provided in the gasket body.

In the gasket of the present invention having the above-described configuration, the tab is provided in the gasket body, so that the plane area of the gasket body is enlarged, and therefore the carrier film can be detached from the gasket body by using the tab. Specifically, the carrier film can be detached from the gasket body in a state where the gasket body is fixed to the base with the tab or the carrier film can be detached from the gasket body with the tab in a state where the carrier film is fixed to the base. When the gasket body is used as a fuel cell gasket to be incorporated in a fuel cell stack, for example, the fixation by evacuation or the holding by a chucking jig is difficult to achieve because the gasket body has a small wire diameter as described above. Then, by performing the evacuation or the chucking for the tab in place of the gasket body or together with the gasket body, the detachment work can be facilitated.

In the carrier film, a gasket holding portion containing a three-dimensional shape deformed along the outer shape of the gasket body may be provided in a portion overlapping with the gasket body on the plane.

The gasket body is used as a fuel cell gasket to be incorporated in a fuel cell stack, for example, as described above.

A method for manufacturing the gasket includes performing, processes of clamping a mold for molding the gasket body in a state where the carrier film of a planar shape is inserted between parting portions of the mold, molding the gasket body with the mold, and then deforming a part on the plane of the carrier film with molding material charging pressure along a mold cavity inner surface when molding the gasket body to thereby mold the gasket holding portion containing the three-dimensional shape, and opening the mold after molding the gasket body, and then simultaneously taking out the gasket body and the carrier film from the mold. As the mold, one having a tab molding cavity portion for molding a tab together with a cavity portion for molding the gasket body is used.

As a method for handling the gasket, i.e., a method for detaching the carrier film from the gasket body, the carrier film is detached from the gasket body in a state where the gasket body is fixed to a base with the tab, or the carrier film is detached from the gasket body with the tab in a state where the carrier film is fixed to the base as described above.

Effect of the Invention

As described above, according to the present invention, when the carrier film is detached from the gasket body, the carrier film can be easily detached even when the gasket body adheres to the carrier film.

BRIEF EXPLANATION OF THE DRAWINGS

FIGS. 1A and 1B are views illustrating a gasket with a carrier film according to a first embodiment of the present invention, in which

FIGS. 5A and 5B are views illustrating a gasket with a carrier film according to a second embodiment of the present invention, in which FIG. 5A is a plan view thereof and FIG. 5 is an enlarged cross-sectional view of a principal portion thereof and is an enlarged cross-sectional view along the D-D line of FIG. 5A;

FIGS. 8A and 8B are views illustrating a rubber-only gasket according to a conventional example, in which FIG. 8A is a plan view thereof and FIG. 8 is an enlarged cross-sectional view of a principal portion thereof and is an enlarged cross-sectional view along the E-E line of FIG. 8A;

FIGS. 9A and 9B are views illustrating a gasket with a carrier film according to a reference example, in which FIG. 9A is a plan view thereof and FIG. 9 is an enlarged cross-sectional view of a principal portion thereof and is an enlarged cross-sectional view along the F-F line of FIG. 9A;

DETAILED DESCRIPTION OF PREFERRED EMBODIMENTS

Next, embodiments of the present invention are described with reference to the drawings.

First Embodiment

Figure 1A:
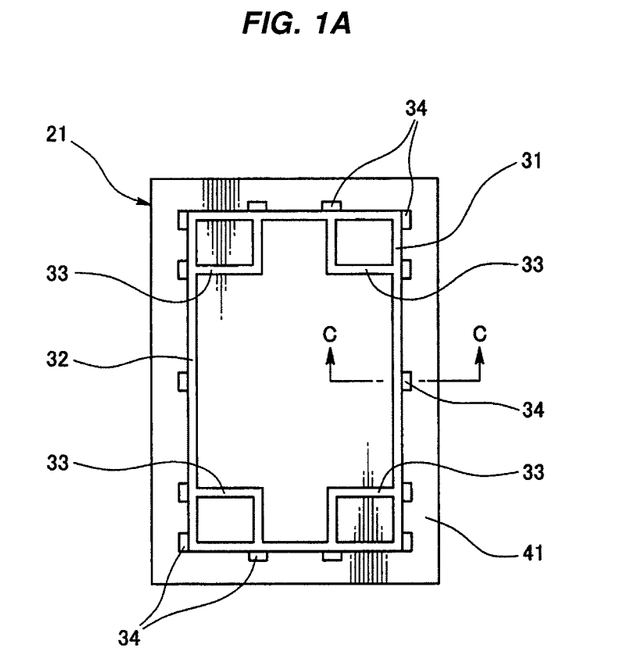
FIG. 1A is a plan view thereof and (B) is an enlarged cross-sectional view of a principal portion thereof and is an enlarged cross-sectional view along the C-C line of FIG. 1A.
Figure 1B:
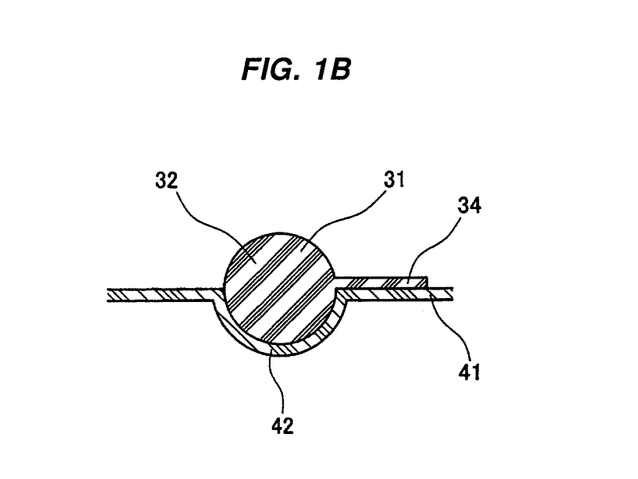

A gasket 21 according to this embodiment is configured by a combination of a rubber-only gasket body 31 and a carrier film 41 containing a resin film holding the gasket body 31 as illustrated in FIGS. 1A and 1B. The gasket body 31 and the carrier film 41 are not bonded to each other but the gasket body 31 adheres to the carrier film 41 due to the characteristics of the material quality and the like of the gasket body 31 in some cases. The gasket body 31 is used as a fuel cell gasket. The carrier film 41 is also referred to as a carrier sheet or a gasket holding member.

The gasket body 31 is molded into a planar shape (plate shape) as a whole by a predetermined rubber-like elastic body (for example, VMQ, PIB, EPDM, FKM, and the like), and an outer peripheral seal portion 32 sealing the entire circumference of the surrounding of a reaction surface of a fuel cell is provided in a planar rectangular frame shape. Moreover, in order to seal the surrounding of each manifold portion, manifold seal portions (inner seal portion) 33 located in both end portions in the longitudinal direction of the outer peripheral seal portion 32 are integrally provided. The cross-sectional shape of the gasket body 31 is formed into a circular cross section as illustrated in FIG. 1B but the other cross-sectional shapes may be used.

Moreover, a tab 34 for enlarging the plane area of the gasket body 31 is integrally molded with the gasket body 31 and two or more of the tabs 34 (fourteen tabs 34 in the figure) are provided in the surrounding (outer peripheral side) of the gasket body 31 (outer peripheral seal portion 32). The tab 34 is formed into a planar rectangular shape and is provided in the middle (center or substantially center) in the thickness direction of the gasket body 31 (outer peripheral seal portion 32).

The carrier film 41 is molded into a planar shape (plate shape) by a predetermined resin film and is molded into a planar rectangular shape larger than the gasket body 31. As the resin film, a 0.2 mm thick polypropylene film is used. The 0.2 mm thick polypropylene film is cut into a planar shape of the above-described size to be used. As the resin film, common resin materials other than polypropylene, such as polyethylene and polystyrene, are usable. Moreover, a film containing engineering plastic, such as polyamide (PA) or polybutyleneterephthalate (PBT), is preferably used. The film containing this kind of engineering plastic makes it difficult for the gasket body 31 and the carrier film 41 to adhere to each other and facilitates the separation of the gasket body 31 and the carrier film 41, even in the case of adhesion. The thickness of the film is preferably set to about 0.1 mm to 0.3 mm depending on the wire diameter or the cross-sectional shape of the gasket body 31.

A gasket holding portion (three-dimensional portion) 42 containing a three-dimensional shape of a deformed shape along the outer shape of the gasket body 31 (outline in the cross-sectional shape of the gasket body 31) is provided in a portion which is a part on the plane of the carrier film 41 and overlaps with the gasket body 31 on the plane. The gasket body 31 is partially or entirely (partially in the figure) stored in the gasket holding portion 42 of the three-dimensional shape. The tabs 34 are not stored in the gasket holding portion 42 of the three-dimensional shape and brought into a state of overlapping with a plane portion of the carrier film 41 in the thickness direction.

In the gasket 21 having the above-described configuration, the rubber-only gasket body 31 is held by the carrier film 41 containing a resin film, and therefore the gasket body 31 is hard to be twisted when carrying the gasket 21, and thus is easy to carry. Accordingly, the handling workability of the gasket 21 can be improved.

Moreover, the gasket holding portion 42 of the three-dimensional shape is provided in the carrier film 41 and the gasket body 31 is partially or entirely stored in the gasket holding portion 42, and therefore the gasket body 31 is positioned on the plane with respect to the carrier film 41. Accordingly, the gasket body 31 does not shift with respect to the carrier film 41 in carrying the gasket 21, and therefore the gasket body 31 can be firmly held by the carrier film 41.

Next, a method for producing the gasket 21 is described. For the production, a mold (rubber forming die) for injection-molding the rubber-only gasket body 31 is used.

Figure 2A:
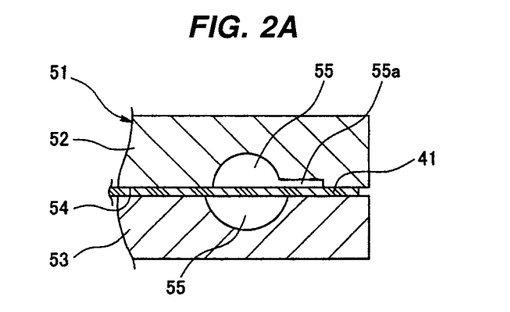
FIGS. 2A to 2D each are views explaining a method for producing the gasket.

As a process, first, the carrier film 41 of a planar shape cut into a planar shape of a predetermined size is prepared, and then the mold 51 is clamped in a state where the carrier film 41 is inserted between parting portions 54 of the mold 51 as illustrated in FIG. 2A. The mold 51 has a combination of an upper mold (one divided mold) 52 and a lower mold (the other divided mold) 53. Cavity portions 55 for molding the gasket body 31 (gasket molding cavity portions) each are provided in the parting portions 54 of both the molds 52 and 53. A tab molding cavity portion 55a for molding the tab 34 is provided as a part thereof in the parting portion 54 of the upper mold 52. The entire surface of the carrier film 41 originally has a planar shape, and therefore the carrier film 41 is brought into a state of crossing the inside of the cavity portions 55.

Figure 2B:
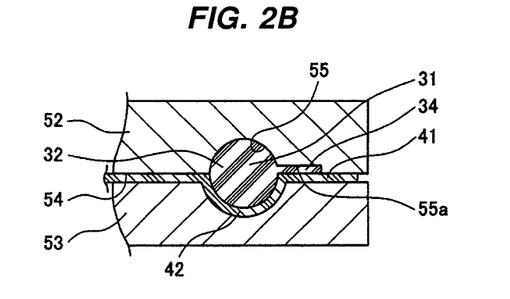

Subsequently, as illustrated in FIG. 2B, a molding material for molding the gasket body 31 and the tab 34 is charged into the cavity portions 55, and then heated, for example, to integrally mold the gasket body 31 and the tab 34. When the molding material is charged into the cavity portions 55, a part on the plane of the carrier film 41 is pressurized against the inner surface of the cavity portion 55 of the under mold 53 by the molding material charging pressure, and is deformed (plastically deformed) into a shape along the inner surface of the cavity portion 55, whereby the gasket holding portion 42 containing a three-dimensional shape is molded.

Figure 2C:
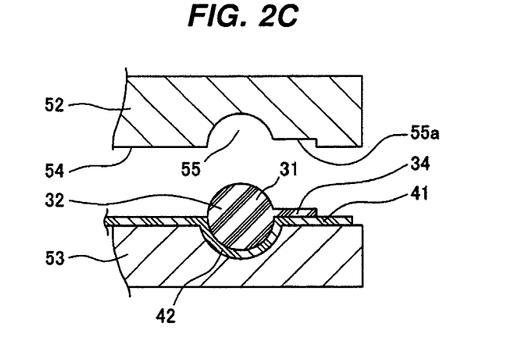
Figure 2D:
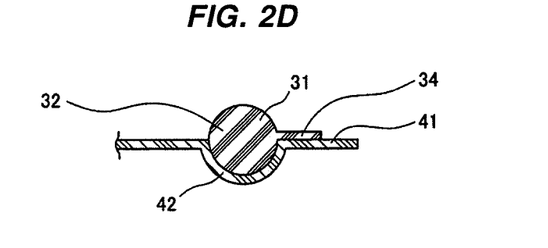

Subsequently, after the molding of the gasket body 31, the mold is opened as illustrated in FIG. 2C, and then the gasket body 31 and the carrier film 41 are simultaneously taken out from the mold 51 as illustrated in FIG. 2D. The gasket body 31 and the carrier film 41 which are taken out are brought into a combination state in which the gasket body 31 is held by the carrier film 41. In the combination state, a product is carried or stored, for example. The gasket body 31 held by the carrier film 41 is hard to be twisted, for example, and therefore the handling workability can be improved as compared with a case of handling the gasket body 31 alone.

The gasket body 31 and the carrier film 41 are not bonded to each other. However, the gasket body 31 has adhesiveness on the surface due to the characteristics of the material quality of the gasket body 31, the moldability by the mold 51, or the like, and, due to the adhesiveness, the gasket body 31 adheres to the carrier film 41 in some cases. Then, in this embodiment, the tabs 34 are integrally provided in the gasket body 31 as described above, so that the subsequent handling is facilitated, even when the gasket body 31 adheres to the carrier film 41 as described above.

A method for handling the gasket 21, i.e., a method for detaching the carrier film 41 from the gasket body 31, is as follows.

Figure 3A:
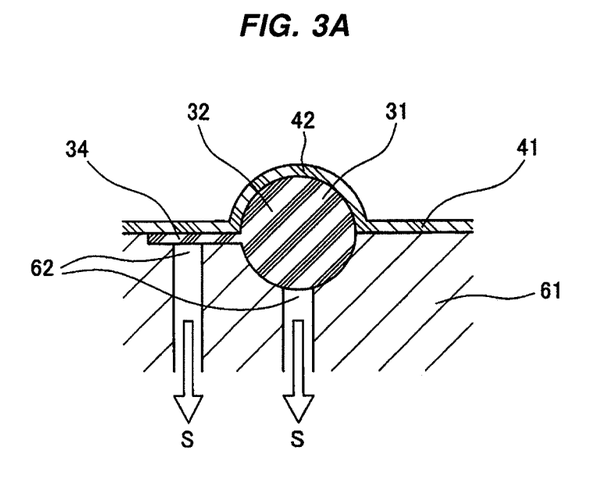
FIGS. 3A and 3B each are views explaining a method for handling the gasket.
Figure 3B:
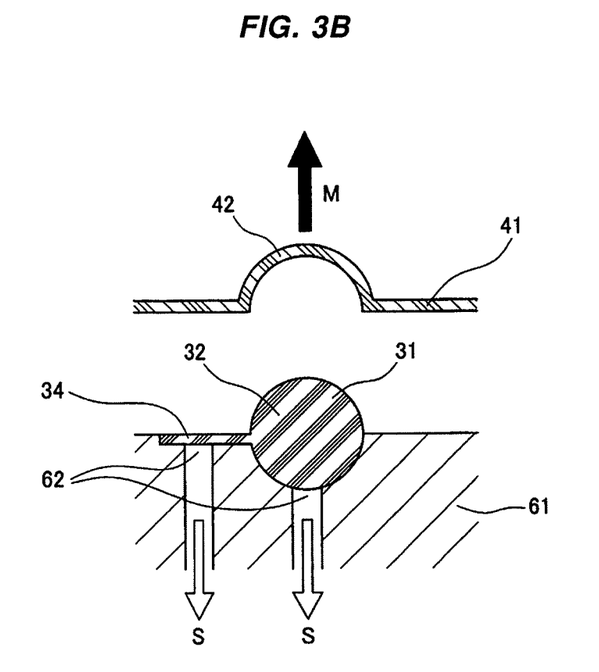

More specifically, the gasket body 31 and the tab 34 are set in adsorption portions 62 of an evacuation device 61 as a base, and then evacuation (arrow S) is performed to adsorb (fix) the gasket body 31 as illustrated in FIG. 3A. Subsequently, the carrier film 41 is chucked (held) by using a chucking jig (not illustrated) or the like to be raised, and then the carrier film 41 is detached (arrow M) from the gasket body 31 in the adsorption state as illustrated in FIG. 3B.

Figure 4A:
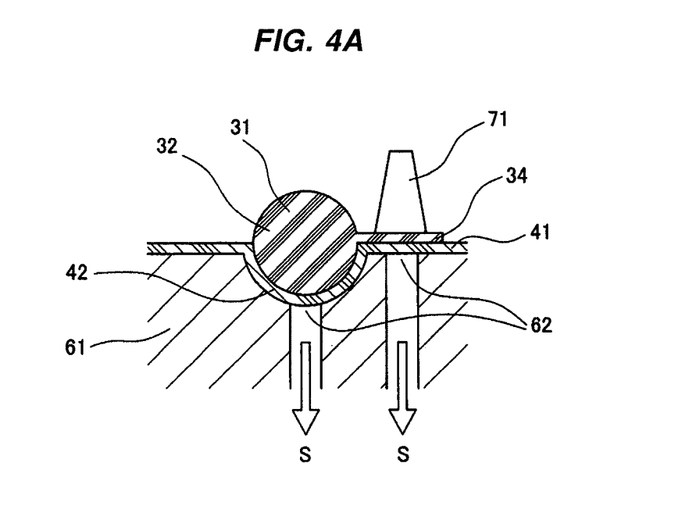
FIGS. 4A and 4B each are views explaining a method for handling the gasket.
Figure 4B:
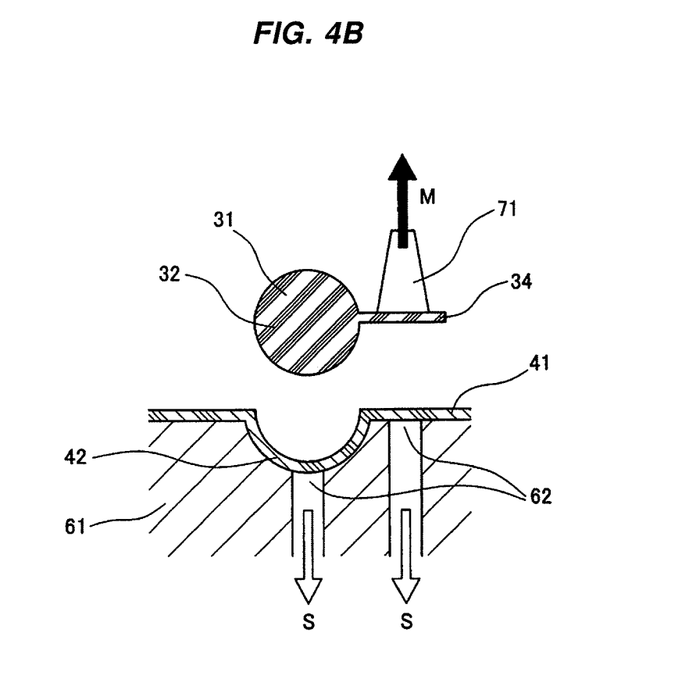

Alternatively, the carrier film 41 is set in the adsorption portions 62 of the evacuation device 61 as a base, and then evacuation (arrow S) is performed to adsorb (fix) the carrier film 41 as illustrated in FIG. 4A. Subsequently, the tab 34 is chucked (held) by using a chucking jig 71 or the like to be raised, and then the carrier film 41 is relatively detached (arrow M) from the gasket body 31 in the adsorption state as illustrated in FIG. 4B.

In the tab 34, the width or the plane area thereof can be set so as to be larger than the width (wire diameter) or the plane area (plane area corresponding to the tab length) of the gasket body 31. Therefore, when the tab 34 is adsorbed to the evacuation device 61 (FIGS. 3A and 3B), the adsorption area can be enlarged and the adsorption force can be enhanced and, when the tab is chucked by the chucking jig 71 (FIGS. 4A and 4B), the chucking area can be enlarged and the tensile force by the chucking jig 71 can be enhanced. Therefore, by performing the detachment work by using the tab 34 as described above, the carrier film 41 can be easily detached even when the gasket body 31 adheres to the carrier film 41. The adsorption by the evacuation device 61 may be performed only for the tabs 34.

Second Embodiment

Figure 5A:
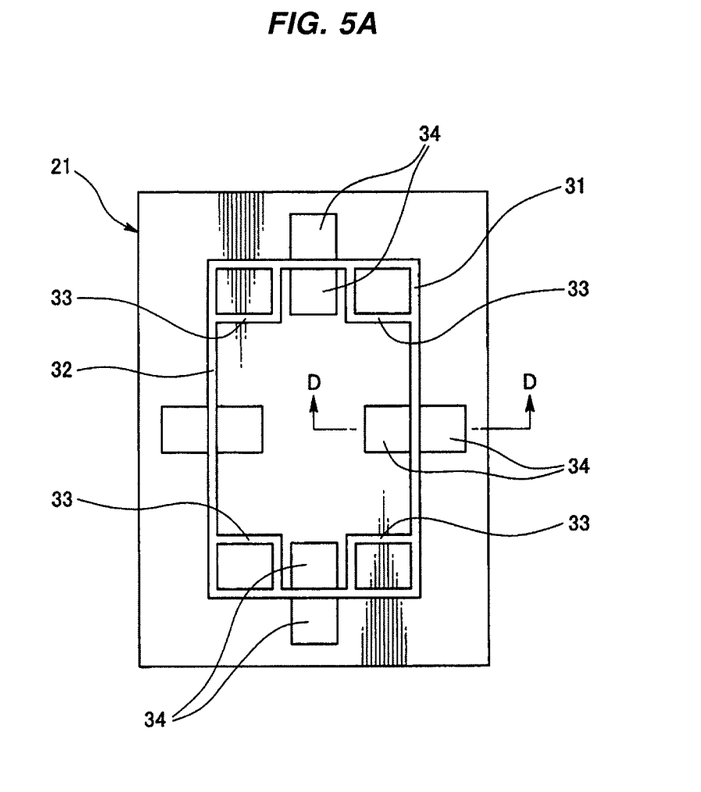
Figure 5B:
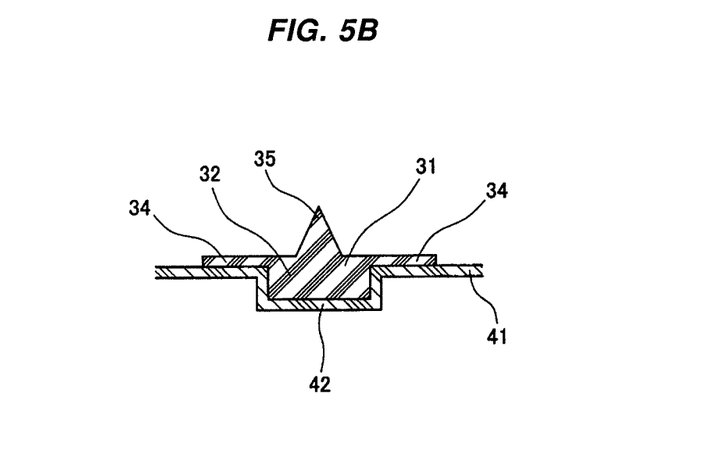

As the cross-sectional shape of the gasket body 31, various shapes are mentioned. For example, the gasket body 31 is formed into a rectangular cross section and a seal lip 35 is integrally molded on the plane in a second embodiment illustrated in FIGS. 5A and 5B.

Figure 6A:
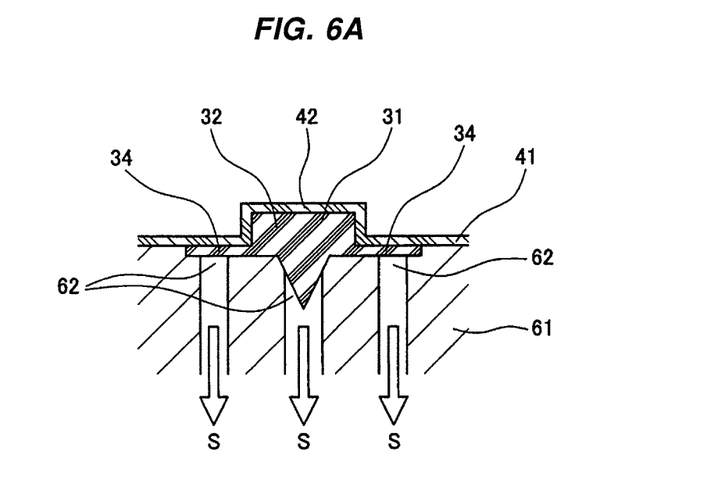
FIGS. 6A and 6B each are views explaining a method for handling the gasket.
Figure 6B:
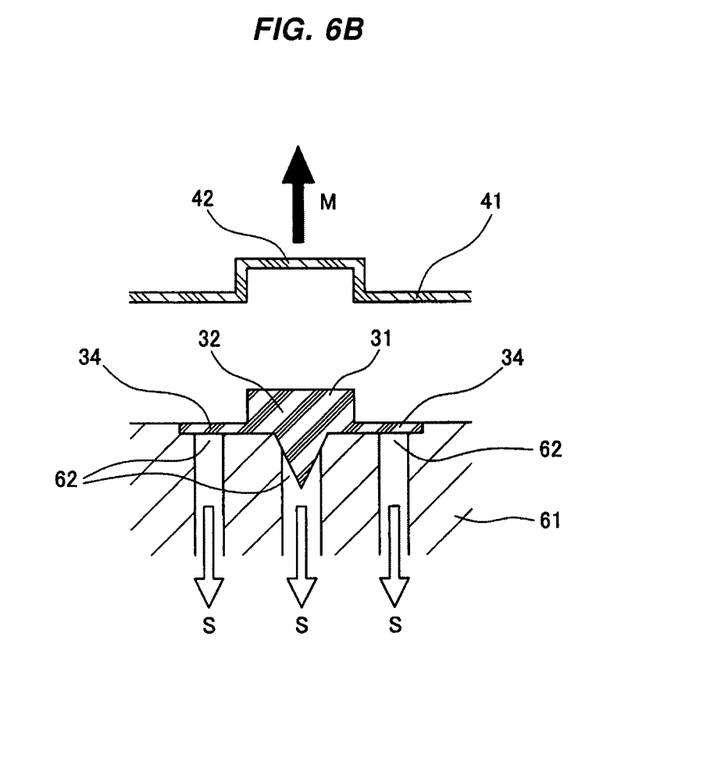
Figure 7A:
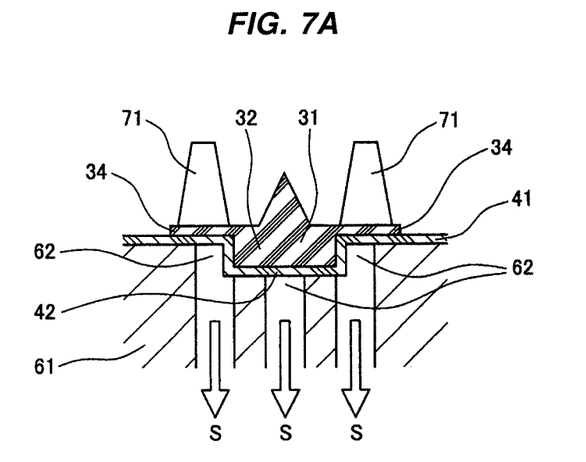
FIGS. 7A and 7B each are views explaining a method for handling the gasket.
Figure 7B:
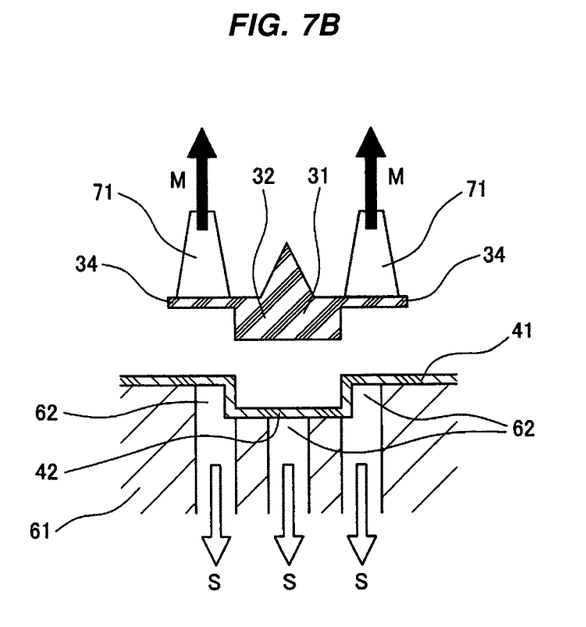

The plane shape, the size, the number, the arrangement, and the like of the tab 34 are variously set. In the example illustrated in FIGS. 5A and 5B, for example, two or more of the tabs 34 each are provided to form a pair on the outer peripheral side and on the inner peripheral side of the gasket body 31 (outer peripheral seal portion 32). Then, in this case, the tabs 34 on the outer peripheral side and the tabs 34 on the inner peripheral side each are adsorbed to the evacuation device 61 (FIGS. 6A and 6B) or chucked with the chucking jig 71 (FIGS. 7A and 7B).

DESCRIPTION OF REFERENCE NUMERALS 21 gasket with carrier film
31 gasket body
32 outer peripheral seal portion
33 manifold seal portion
34 tab
35 seal lip
41 carrier film
42 gasket holding portion
51 mold
52 upper mold
53 lower mold
54 parting portion
55 55a cavity portion
61 evacuation device
62 adsorption portion
71 chucking jig

What is claimed is:
1. A gasket with a carrier film, comprising:
a combination of a rubber-only gasket body; and
a carrier film holding the gasket body to be detachable from the carrier film, wherein
the gasket body is integrally provided with a plurality of tabs enlarging a plane area of the gasket body,
the tabs project outward from a plurality of positions along an outer periphery of the gasket body, and
the tabs each project outward from a portion of the gasket body that is between ends of the gasket body that are opposite one another, one of the ends being an end of the gasket body that is held by the carrier film.
2. The gasket according to claim 1, wherein
a gasket holding portion containing a three-dimensional shape deformed along an outer shape of the gasket body is provided in a portion overlapping with the gasket body on a plane in the carrier film.
3. The gasket according to claim 2, wherein
the gasket body is used as a fuel cell gasket to be incorporated in a fuel cell stack.
4. A method for manufacturing the gasket according to claim 2, the method comprising:
clamping a mold for molding the gasket body in a state where the carrier film of a planar shape is inserted between parting portions of the mold;
molding the gasket body with the mold, and then deforming a part on a plane of the carrier film with molding material charging pressure along a mold cavity inner surface when molding the gasket body to thereby mold the gasket holding portion containing the three-dimensional shape; and
opening the mold after molding the gasket body, and then simultaneously taking out the gasket body and the carrier film from the mold,
wherein the mold has a tab molding cavity portion for molding the tabs.
5. A method for handling the gasket according to claim 2, comprising:
detaching the carrier film from the gasket body in a state where the gasket body is fixed to a base with the tabs when the carrier film is detached from the gasket body.
6. A method for handling the gasket according to claim 2, comprising:
detaching the carrier film from the gasket body with the tabs in a state where the carrier film is fixed to a base when the carrier film is detached from the gasket body.
7. The gasket according to claim 1, wherein
the gasket body is used as a fuel cell gasket to be incorporated in a fuel cell stack.
8. A method for manufacturing the gasket according to claim 7, the method comprising:
clamping a mold for molding the gasket body in a state where the carrier film of a planar shape is inserted between parting portions of the mold;
molding the gasket body with the mold, and then deforming a part on a plane of the carrier film with molding material charging pressure along a mold cavity inner surface when molding the gasket body to thereby mold the gasket holding portion containing the three-dimensional shape; and
opening the mold after molding the gasket body, and then simultaneously taking out the gasket body and the carrier film from the mold,
wherein the mold has a tab molding cavity portion for molding the tabs.
9. A method for handling the gasket according to claim 7, comprising:
detaching the carrier film from the gasket body in a state where the gasket body is fixed to a base with the tabs when the carrier film is detached from the gasket body.
10. A method for handling the gasket according to claim 7, comprising:

detaching the carrier film from the gasket body with the tabs in a state where the carrier film is fixed to a base when the carrier film is detached from the gasket body.

11. A method for manufacturing the gasket according to claim 1, the method comprising:
   clamping a mold for molding the gasket body in a state where the carrier film of a planar shape is inserted between parting portions of the mold;
   molding the gasket body with the mold, and then deforming a part on a plane of the carrier film with molding material charging pressure along a mold cavity inner surface when molding the gasket body to thereby mold the gasket holding portion containing the three-dimensional shape; and
   opening the mold after molding the gasket body, and then simultaneously taking out the gasket body and the carrier film from the mold,
   wherein the mold has a tab molding cavity portion for molding the tabs.

12. A method for handling the gasket according to claim 1, comprising:
   detaching the carrier film from the gasket body in a state where the gasket body is fixed to a base with the tabs when the carrier film is detached from the gasket body.

13. A method for handling the gasket according to claim 1, comprising:
   detaching the carrier film from the gasket body with the tabs in a state where the carrier film is fixed to a base when the carrier film is detached from the gasket body.

\* \* \* \* \*